United States Patent [19]

Thiermann, Sr.

[11] Patent Number: 4,527,651

[45] Date of Patent: Jul. 9, 1985

[54] REMOTE CONTROL HANDLE ASSEMBLY

[75] Inventor: William E. Thiermann, Sr., Glendale, Wis.

[73] Assignee: Racine Federated Inc., Racine, Wis.

[21] Appl. No.: 553,742

[22] Filed: Nov. 17, 1983

[51] Int. Cl.³ ............................................. B62D 51/04
[52] U.S. Cl. ..................................... 180/19.2; 74/491; 74/501 R; 180/19.3
[58] Field of Search .................... 180/19.1, 19.2, 19.3, 180/9.22, 904; 74/491, 10 A, 501 R

[56] References Cited

U.S. PATENT DOCUMENTS

| | | | |
|---|---|---|---|
| 1,565,803 | 12/1925 | Jensen | 74/487 |
| 1,891,208 | 12/1932 | Schuetz | 74/501 R |
| 3,791,469 | 2/1974 | Prosser et al. | 180/6.2 |
| 4,069,720 | 1/1978 | Thor | 74/491 |

FOREIGN PATENT DOCUMENTS 415971  11/1946  Italy ................................. 180/9.22

*Primary Examiner*—John A. Pekar
*Attorney, Agent, or Firm*—Wood, Dalton, Phillips, Mason & Rowe

[57] ABSTRACT

A remote control handle assembly for remote control of a powered dolly, with the control handle assembly including a handle mount which rotatably mounts a pair of handles. The powered dolly has a pair of spring-centered valves and a pair of mechanical push-pull cables extending between the handle mount and the valves, with a movable inner cable of each push-pull cable connected one to each of the handles. Rotation of one handle controls forward-reverse direction of travel of the powered dolly and the rotation of the other handle controls steering, with the rotational axes of the handles being structurally related whereby one handle counteracts the rotational torque of the other handle.

10 Claims, 4 Drawing Figures

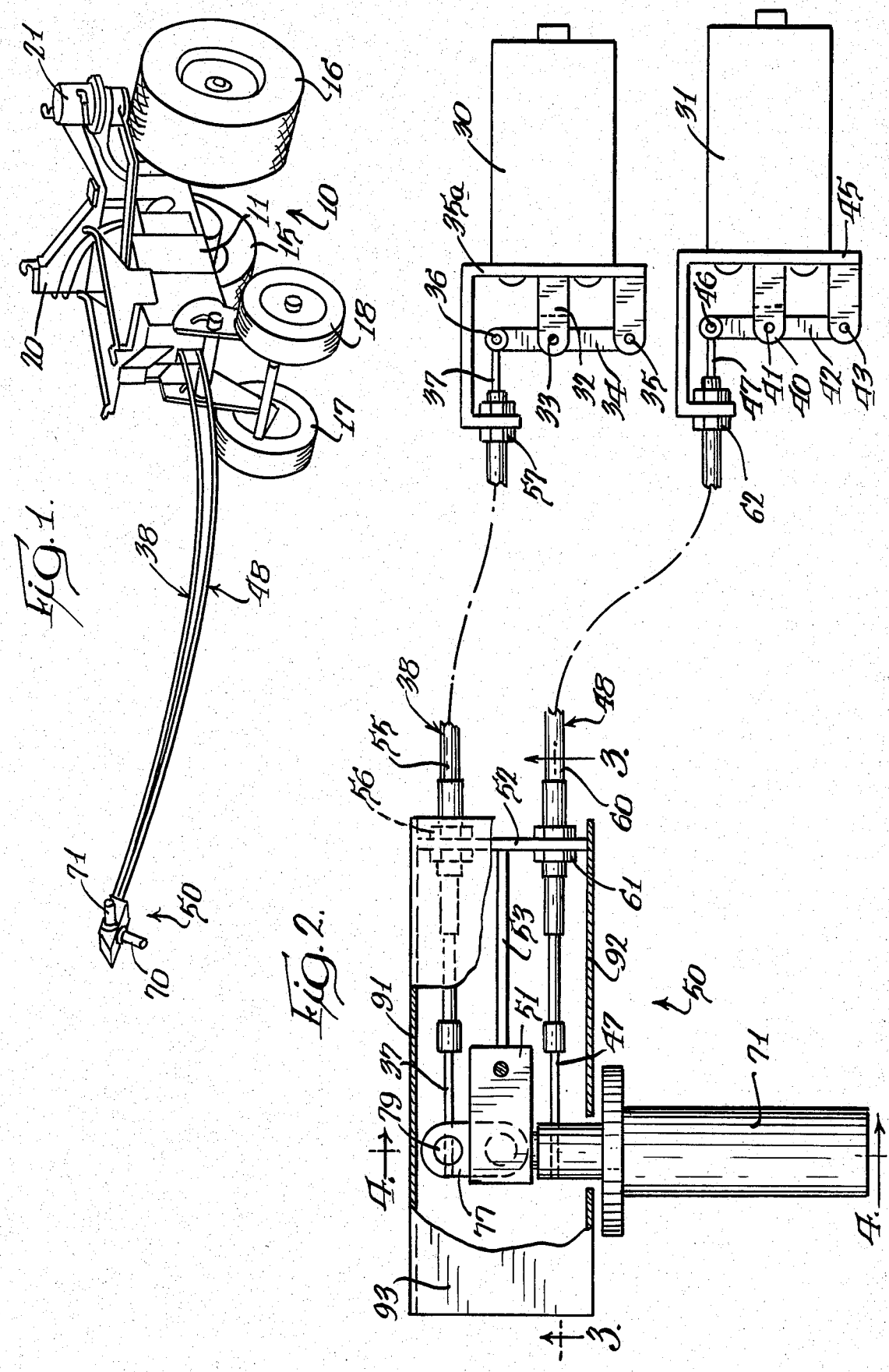

REMOTE CONTROL HANDLE ASSEMBLY

BACKGROUND OF THE INVENTION

This invention pertains to a remote control handle assembly and, more particularly, to such an assembly for controlling steering and direction of travel of a powered dolly without any rigid connection between the assembly and the powered dolly. The only connection is by a pair of signal-transmitting members in the form of flexible push-pull mechanical cables connected to the handles which are rotatable for control of steering and direction of travel and which have their rotational axes oriented relative to each other whereby one handle counteracts the rotational torque of the other handle.

Utility companies frequently have to set poles for holding power lines or position other equipment, such as transformers, in positions on private property or in other limited access areas. Applicant has developed many products to assist in these operations, such as the polesetting apparatus shown in U.S. Pat. No. 4,362,451 and the dolly shown in U.S. Pat. No. 3,315,976. The dolly shown in the prior patent is either pushed or pulled to the location at which the pole is to be set. In order to avoid the manual effort required in such movement, applicant has now developed a powered dolly which can be either connected to a transport device or support structure whereby the powered dolly is itself the transport device. It is desirable to have a remote control handle assembly whereby steering and forward-reverse direction of travel of the powered dolly can be controlled at a distance from the powered dolly by a person standing at the rear or side of the powered dolly. Previously known remote controls have used electric power; thus, the known type of control would require a source of electricity associated with the powered dolly.

SUMMARY OF THE INVENTION

A primary feature of the invention disclosed herein is to provide a remote control handle assembly for a powered dolly wherein there is no rigid connection between the control handle assembly and the powered dolly to permit free movement of an operator relative to the powered dolly and the control is achieved by mechanical means without the need for any source of electricity.

A further feature of the invention is to provide a remote control handle assembly as defined in the preceding paragraph wherein the handle mount rotatably mounts a pair of handles, each of which is operatively connected to the powered dolly through a flexible push-pull mechanical cable and with the inner cable thereof connected to the handle and wherein the control handles are placed at an angle to each other to counteract their respective rotational torque during operation, with there being the capability of simultaneous operation of both handles for simultaneous control of both steering and forward-reverse direction of travel.

Still another feature of the invention is to provide a remote control system utilizing the control handle assembly described in the preceding paragraphs wherein each of the inner cables is connected one to each of a pair of spring-centered valves at the powered dolly for control of steering and direction of travel and with the valves urging each of the handles to a neutral position With the structure as described herein, the powered dolly can be connected to a transport device or itself mount structure to be a transport device, and the travel of the transport device can be controlled remotely through use of the remote control handle assembly. The orientation of the handles relative to each other enables the handle assembly to be free of any fixed support and connection to the powered dolly except through the flexible cables with independent or simultaneous operation of the handles. There is no erratic control of either steering or direction of travel when moving over uneven terrain as would be encountered if a joy-stick-type control were used.

Although the invention is described in connection with control of a powered dolly, it will be evident that the remote control handle assembly can be used for remotely controlling plural functions of other devices.

BRIEF DESCRIPTION OF THE DRAWINGS

FIG. 1 is a perspective view of a powered dolly with the remote control handle assembly associated therewith;

FIG. 2 is a plan view of the remote control handle assembly with parts broken away and shown in association with a pair of spring-centered valves which are part of the powered dolly;

DESCRIPTION OF THE PREFERRED EMBODIMENT

Figure 3:
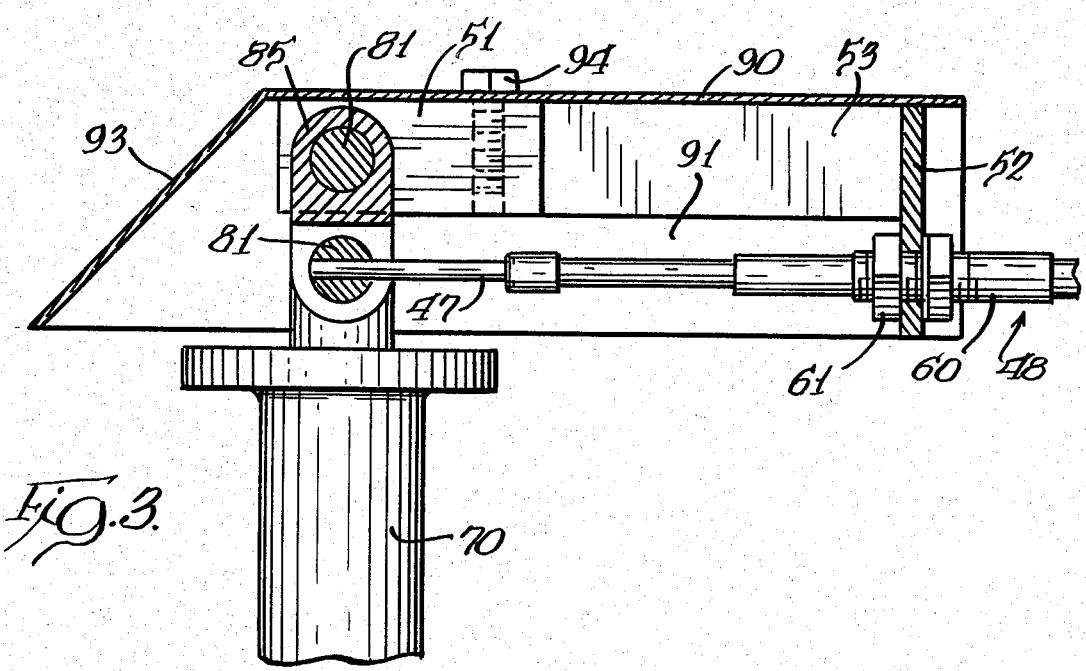
FIG. 3 is a vertical section on an enlarged scale, taken generally along the line 3—3 in FIG. 2.
Figure 4:
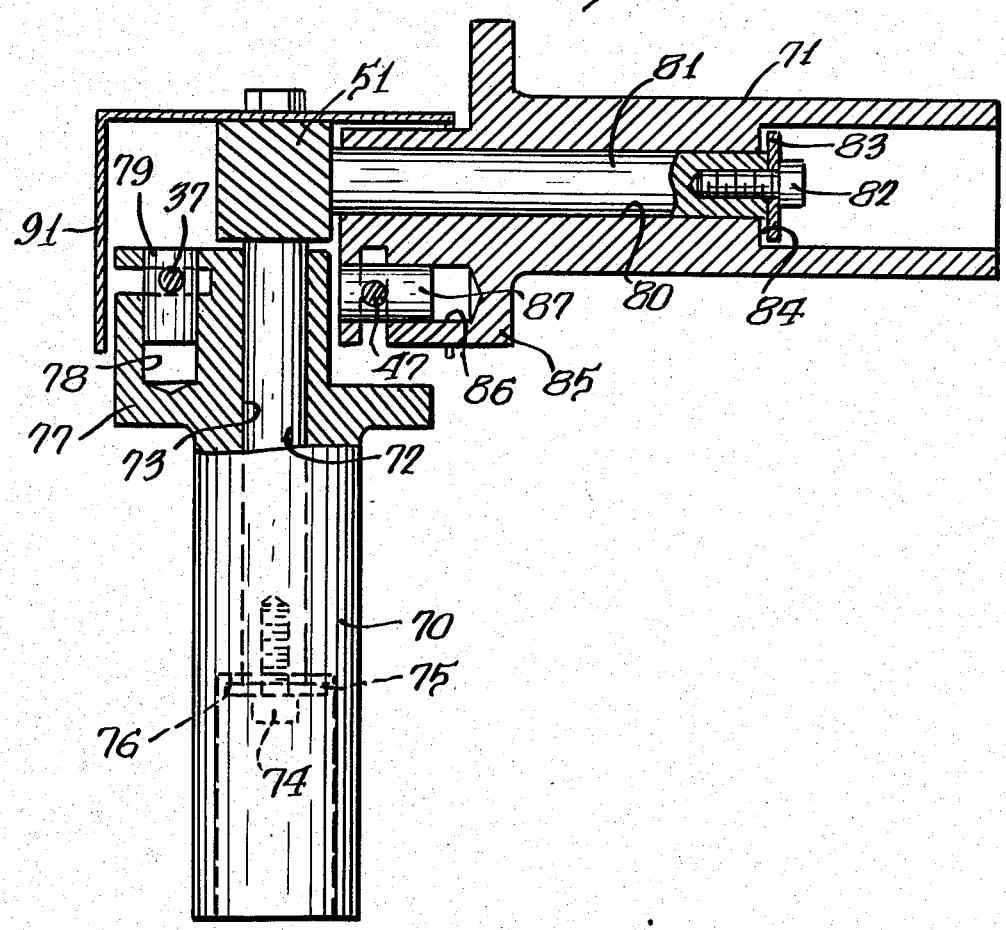
FIG. 4 is a vertical section, taken generally along the line 4—4 in FIG. 2 and on an enlarged scale.

The powered dolly, indicated generally at 10 in FIG. 1, has a frame 11 mounting a pair of drive wheels 15 and 16 and a pair of support wheels 17 and 18. The powered dolly has a removable power pack (not shown) with an engine-driven pump for supplying fluid to motors (not shown) associated with the drive wheels 15 and 16 for rotation of the wheels and for also supplying fluid to a cylinder (not shown) which, through mechanical linkage, can turn the wheels about vertical rotation axes at the wheel mountings 20 and 21, respectively, for controlling steering of the powered dolly. The use of a hydraulic power system for supplying motors and cylinders controlling movement of a device are well known in the art and, therefore, have not been shown nor described in detail.

The powered dolly has a pair of control devices in the form of spring-centered valves 30 and 31, shown in FIG. 2. The valve member 30 has a movable valve member 32 for controlling the flow of fluid to the steering cylinder for the powered dolly. An end of the valve member 32 is pivotally connected at an end thereof to a link 34 intermediate the ends of the latter. One end of the link 34 is pivoted at 35 to a frame bracket 35a supported from the body of the valve and the other end of the link is pivotally connected at 36 to an inner cable 37 of a first cable system which is a flexible mechanical push-pull cable 38.

The valve member 31 has a movable valve member 40 for controlling the flow of fluid to the motors which rotate the drive wheels 15 and 16 for controlling the speed and either a forward or reverse direction of travel of the powered dolly. The movable valve member 40, at one end, is pivotally connected at 41 to a link 42 intermediate its ends. One end of the link 42 is pivotally connected at 43 to a bracket 45 supported from the body of the valve member 31. The other end of the link 42 is pivotally connected at 46 to an inner cable 47 of a second cable system which is a flexible mechanical push-pull cable 48.

The remote control handle assembly is indicated generally at 50 and has a handle mount including a block 51 which is fixed to a plate 52 by means of a rod 53.

The push-pull mechanical cables provide a pair of cable systems acting as signal-transmitting members for transmitting motion from the remote control handle assembly to the valves 30 and 31. The mechanical cable 38 has an outer sheath 55 movably supporting the inner cable 37, with one end extending through an opening in the plate 52 and held against longitudinal movement by fastening means 56. The other end of the sheath 55 extends through an opening and is attached to the mounting bracket 35a associated with the valve 30 and held against movement by fastening means 57.

The mechanical cable 48 has an outer sheath 60 extended through an opening in the plate 52 and held against longitudinal movement by fastening means 61 and the other end of the sheath extends through an opening in the mounting bracket 45 and is held against longitudinal movement by fastening means 62.

The remote control handle assembly 50 has a pair of rotatable handles which may be of the motorcycle type, with a first handle 70 being rotatable to control steering of the powered dolly and a second handle 71 being rotatable to control the speed and forward-reverse direction of travel of the powered dolly. The rotatable handle 70 is rotatably mounted on a rod 72 fixed to the block 51 of the handle mount and extending downwardly therefrom. The handle has an internal opening 73 whereby the handle loosely fits on the rod 72 and a threaded retention member 74 threads into the lower end of the rod 72 and captures a washer 75 against an end shoulder 76 within the handle to rotatably retain the handle on the rod. The rod 72 defines an axis of rotation for the handle 70. The handle has a shoulder 77 offset from the axis of rotation, with a recess 78 to loosely receive a pin 79 to which an end of the movable inner cable 37 is secured. Rotation of the handle 70 from a neutral position results in movement of the inner cable 37 relative to the outer sheath 55 and resulting movement of the valve member 32 of the valve 30. Rotation of the handle in one direction will cause the powered dolly to steer to the left, while rotation in the other direction will cause the powered dolly to steer to the right.

The handle 71 is mounted similarly to the handle 70, with the handle having a central opening 80 which loosely fits on a rod 81 fixed to and extending laterally from the block 51 of the handle mount. The handle 71 is held on the rod by a threaded fastening member 82 which supports a washer 83 in position adjacent a shoulder 84 within the opening of the handle. The rod 81 defines an axis of rotation for the handle 71. The handle has an offset shoulder 85 with a recess 86 in which a pin 87 is loosely positioned and this pin has an end of the inner cable 47 secured thereto.

A cover member with a top 90, depending sides 91 and 92, and a sloped end 93 generally encloses the control handle assembly except for the handles and is removably secured to the block 51 by a threaded member 94.

In use, the handles 70 and 71 can be held in the orientation shown in the drawings or in any desired position due to the flexible connections to the powered dolly.

The rotational axes for the handles 70 and 71 defined by the rods 72 and 81 are structurally related whereby one handle counteracts the rotational torque of the other handle. With this structural relation, an operator can hold both handles and achieve rotation of one or the other of the handles or both handles simultaneously. More particularly, the axes of rotation of the two handles are at 90° to each other. With the handle 70 held in one hand, rotation of the handle 71 will impart longitudinal movement to the inner cable 47 relative to the outer sheath 60 of the cable because of the outer sheath 60 being held against movement by its connection to the plate 52, the block 51, and the handle 70. A similar action occurs when the handle 71 is held and the handle 70 is rotated. It is possible to have combined steer and direction control by rotation of both handles simultaneously.

With the valve members 32 and 40 of the valves 30 and 31 being spring-centered, the force of the springs within the valves acting to return the valve members to center position will act through the inner cables 37 and 47 to return the handles 70 and 71 to neutral position when a turning force is removed from the handles.

In operation, the engine of the power pack is started to operate the hydraulic pump. An operator can then stand at any position at some distance from the powered dolly and rotate the handle 71 in a clockwise direction, as viewed in FIG. 1, to cause forward movement of the powered dolly or in a counterclockwise direction to cause rearward movement. The handle 70 can be rotated in one direction or the other for steering to the right and left and, as previously stated, both of the handles 70 and 71 may both be rotated from neutral position simultaenously to control the steering as well as direction of travel of the powered dolly.

I claim:

1. A control handle assembly for signalling two different commands independently of each other to a device to be controlled comprising, a handle mount independent of said device, a pair of flexible signal-transmitting members carried on said handle mount and extending to said device, and a pair of handles rotatably mounted on said handle mount and connected one to each of said signal-transmitting members, said handles being mounted for rotation about separate axes with said axes being structurally related whereby one handle counteracts the rotational torque of the other handle.

2. A control handle assembly for remotely signalling two different commands independently of each other to a powered dolly comprising, a handle mount independent of said powered dolly, a pair of flexible signal-transmitting members carried on said handle mount and extending to said powered dolly, and a pair of handles rotatably mounted on said handle mount and connected one to each of said signal-transmitting members, said handles being mounted for rotation about mutually perpendicular axes.

3. A remote control handle assembly for a powered dolly, said powered dolly having a pair of spring-centered valves operable to control steering and forward-reverse direction of travel of the powered dolly, respectively, comprising, a handle mount remote from said powered dolly, a pair of handles rotatably mounted on said handle mount, one of said handles extending from the side of said handle mount and rotatable to control the direction of travel of the powered dolly, the other of said handles extending downwardly from said handle mount and rotatable to control steering of the powered dolly, a first cable system extended between the powered dolly and the handle mount and having a movable inner cable connected between said one handle and one of said valves whereby handle rotation operates the valve to control steering and the valve urges the handle to a neutral position, and a second cable system extended between the handle mount and the powered dolly and having a movable inner cable connected between said other handle and the other of said valves whereby handle rotation operates the other valve to control direction of travel and the other valve urges the second handle to a neutral position.

4. A remote control handle assembly as defined in claim 3 wherein said handle axes of rotation are at 90° to each other to counteract the respective rotational torques of said handles during operation.

5. A remote control handle assembly as defined in claim 3 wherein each of said handles has a shoulder offset from the axis of handle rotation with a recess in said shoulder and a pin in the recess to which an end of an inner cable is connected.

6. A control handle assembly operable remotely from a device whose movement is to be controlled comprising, a handle mount remote from said device, a pair of elongate members supported on said handle mount and movable relative thereto for transmitting signals to said device and defining the only connections to said device, a pair of handles rotatably mounted on said handle mount, means connecting the pair of handles one to each of said elongate members, and said handles rotating about separate axes which are structurally related whereby one handle can be held to immobilize said handle mount while the other handle is being rotated.

7. A control handle assembly operable remotely from a device having a pair of spring-centered valves whose movement is to be controlled by control of said valves comprising, a handle mount remote from said device, a pair of mechanical push-pull cables supported on said handle mount and movable relative thereto for transmitting signals one to each of said valves and defining the only connections to said device, a pair of handles rotatably mounted on said handle mount, means connecting the pair of handles one to each of said push-pull cables, and said handles rotating about separate axes which are structurally related whereby one handle can be held to immobilize said handle mount while the other handle is being rotated, said spring-centered valves urging return of said handles to a neutral position.

8. A remote control handle assembly for a powered dolly having a pair of control devices comprising, a handle mount remote from said powered dolly, a pair of handles rotatably mounted on said handle mount, one of said handles extending from the side of said handle mount and rotatable about an axis to control the forward-reverse direction of travel of the powered dolly, the other of said handles extending downwardly from said handle mount and rotatable about an axis to control steering of the powered dolly, each of said handles having a shoulder offset from the handle axis of rotation, a first push-pull cable extended between the powered dolly and the handle mount and having a movable inner cable connected between the shoulder of said one handle and one of said control devices whereby handle rotation operates the control device to control steering, and a second push-pull cable extended between the handle mount and the powered dolly and having a movable inner cable connected between the shoulder of said other handle and the other of said control devices whereby handle rotation operates the other control device to control direction of travel, said handle axes of rotation being perpendicular to each other to have one handle counteract the rotational torque of the other handle.

9. A remote control handle assembly as defined in claim 8 wherein said control devices are a pair of spring-centered valves and with the valves urging the handles to a neutral position.

10. A remote control handle assembly as defined in claim 9 wherein said handle mount includes a block, a pair of rods extending from the block at right angles to each other, and said handles being rotatably mounted on said rods.

* * * * *